US009291602B1

(12) United States Patent
Prachar

(10) Patent No.: US 9,291,602 B1
(45) Date of Patent: Mar. 22, 2016

(54) MASS MEASUREMENT

(71) Applicant: Google Inc., Mountain View, CA (US)

(72) Inventor: Timothy John Prachar, Menlo Park, CA (US)

(73) Assignee: Google Inc., Mountain View, CA (US)

(*) Notice: Subject to any disclaimer, the term of this patent is extended or adjusted under 35 U.S.C. 154(b) by 283 days.

(21) Appl. No.: 14/139,934

(22) Filed: Dec. 24, 2013

(51) Int. Cl.
*G01N 29/12* (2006.01)

(52) U.S. Cl.
CPC .................... *G01N 29/12* (2013.01)

(58) Field of Classification Search
CPC .................................................. G01N 29/12
USPC .......................................................... 73/580
See application file for complete search history.

(56) References Cited

U.S. PATENT DOCUMENTS

| 5,852,258 | A | 12/1998 | Tribou | |
| 7,156,918 | B2* | 1/2007 | Marks | A45C 13/28 116/215 |
| 7,235,747 | B1 | 6/2007 | Tribou | |
| 8,373,078 | B2* | 2/2013 | Madhavarao | G01G 19/08 177/1 |
| 9,037,125 | B1* | 5/2015 | Kadous | H04M 1/72577 455/418 |
| 9,104,271 | B1* | 8/2015 | Adams | G06F 3/0426 |
| 2011/0023613 | A1* | 2/2011 | Howard | G01H 11/00 73/649 |
| 2015/0005911 | A1* | 1/2015 | Lake, II | G06Q 50/22 700/91 |
| 2015/0164430 | A1* | 6/2015 | Hu | A61B 5/0004 600/595 |

OTHER PUBLICATIONS

Joyce, G. C., et al., "The Effects of Load and Force on Tremor at the Normal Human Elbow Joint," J. Physiol. (1974), 240, pp. 375-396.
Reynolds, R., et al., "Postmovement Changes in the Frequency and Amplitude of Physiological Tremor Despite Unchanged Neural Output," J. Neurophysiol, 104: 2020-2023, 2010.
Homberg, V., et al., Journal of Neurology, Neurosurgery, and Psychiatry 1987, 50:568-579.

* cited by examiner

*Primary Examiner* — J M Saint Surin
(74) *Attorney, Agent, or Firm* — McDonnell Boehnen Hulbert & Berghoff LLP

(57) ABSTRACT

Herein are described methods and systems for the automatic measurement of the mass of an object. An example method may begin with detecting by a computing device (such as a wearable computing device) an action that corresponds to a mass-measurement mode. In response to detecting the action, the computing device is caused to operate in the mass-measurement mode. The mass-measurement mode may involve receiving a motion-sensor signal from at least one motion sensor, determining a difference between a frequency-component magnitude of at least one given frequency component and a predetermined frequency-component magnitude, determining a mass of an object based on at least the determined difference between the frequency-component magnitude of the at least one given frequency component from the predetermined frequency-component magnitude, and causing an output device to provide an indication of the determined mass of the object.

20 Claims, 8 Drawing Sheets

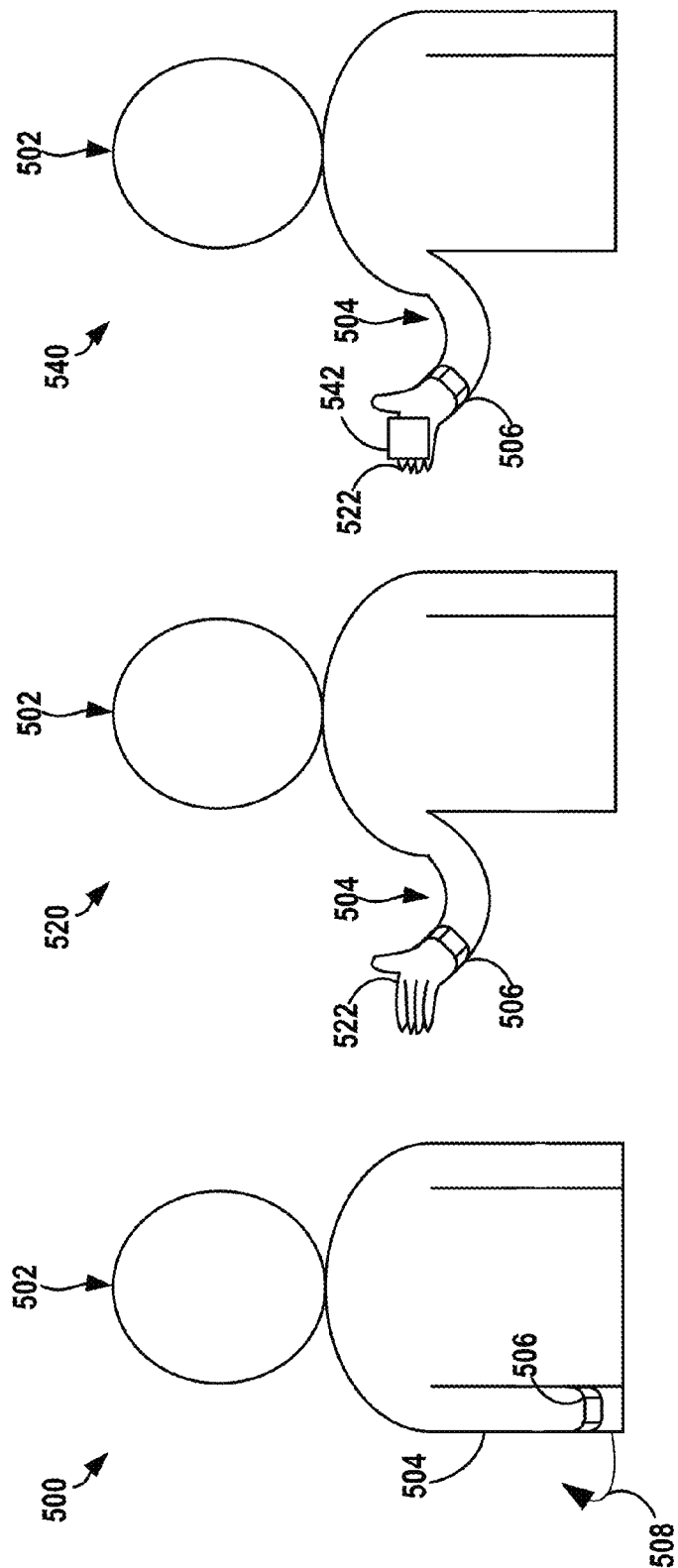

MASS MEASUREMENT

BACKGROUND

Unless otherwise indicated herein, the materials described in this section are not prior art to the claims in this application and are not admitted to be prior art by inclusion in this section.

Computing devices such as personal computers, laptop computers, tablet computers, and cellular phones, among many other types of computing systems, are increasingly prevalent in numerous aspects of modern life. As computing devices become progressively more integrated with users' everyday life, the convenience, efficiency, and intuitiveness of the manner in which users interact with the computing systems becomes greater, and becomes progressively more important.

The trend toward miniaturization of computing hardware, peripherals, as well as sensors, detectors, and image and audio processors, among other technologies, has helped open up a field sometimes referred to as "wearable computing." Wearable computers are, generally, highly portable, and may be designed to be usable at any time, with a minimum amount of cost, distraction, or interruption of the wearer.

One type of wearable computing device is a smartwatch. A smartwatch may be a device that is worn on the wrist or arm, like a traditional watch, but has more interactive features. The display of a smartwatch may be an LCD screen similar to that sometimes found in a smartphone. A smartwatch may also provide internet connectivity. Additionally, a smartwatch may be configured for more intelligent functions than just displaying the time, such as some or all the functionality that is typically provided by smartphones and/or portable digital music players, among other functionality.

Wearable computing devices other than a smartwatch may be equipped with similar such functionality. Such other wearable computing devices may include smartrings, smartgloves, and/or smarthelmets, among other examples.

There may be various ways the wearer may interact with a wearable computing device such as any of those wearable computing devices noted above. For example, a wearer may instruct or otherwise cause the wearable computing device to carry out and/or assist with carrying out certain actions that would otherwise previously be carried out manually by the wearer.

SUMMARY

Herein are described methods and systems for measuring the mass of an object. The methods described herein may be carried out by one or more suitable computing devices. In an embodiment, the methods described herein, or portions thereof, may be carried out by one or more wearable computing devices, such as by a smartwatch. However, the methods described herein may also be carried out by any other suitable computing device or devices, including any other suitable wearable computing device, such as a smartring, smartglove, and/or smarthelmet, among other examples.

In accordance with the methods described herein, the mass of an object may be measured by analyzing certain frequency components of signals received from motion and/or positioning sensors contained within or otherwise communicatively coupled to a wearable computing device. Such frequency components may generally correspond to "inertial characteristics" of the body, e.g., inherent unconscious movements (such as shakes or other moves) of a hand or other body part. For instance, upon a wearer grasping an object of a given mass, the inertial characteristics of the hand may change in such a way that the magnitude(s) of the frequency components of the motion-sensor signal change. More particularly, as one example, unconscious tremors of a hand may proportionally decrease as the mass of the grasped object is increased. This change may be correlated with the mass of the grasped object, and ultimately used in practice to determine the mass of the grasped object.

Further, in accordance with the methods described herein, a wearer may cause a wearable computing device to enter a mass-measurement mode (where the computing device performs certain mass-measurement functions) by performing one or more actions that correspond to the mass-measurement mode. In this way, the wearer may efficiently and intuitively cause the computing device to enter the mass-measurement mode.

In one aspect, an example method may begin with detecting by a computing device an action that corresponds to a mass-measurement mode. In response to detecting the action, the computing device is caused to operate in the mass-measurement mode. The mass-measurement mode may involve a variety of functions. For instance, the mass-measurement mode may involve receiving a motion-sensor signal from at least one motion sensor, where the motion-sensor signal includes a first range of frequency components associated with a first range of frequencies and a second range of frequency components associated with a second range of frequencies, where the second range of frequencies is higher than the first range of frequencies. The mass-measurement mode may then involve determining a difference between a frequency-component magnitude of at least one given frequency component in the second range of frequency components and a predetermined frequency-component magnitude. The mass-measurement mode may then involve determining a mass of an object based on at least the determined difference between the frequency-component magnitude of the at least one given frequency component from the predetermined frequency-component magnitude. And the mass-measurement mode may then involve causing an output device to provide an indication of the determined mass of the object.

In another aspect, an example system may include a non-transitory computer-readable medium and program instructions stored on the non-transitory computer readable medium and executable by at least one processor to cause a computing device to: detect an action that corresponds to a mass-measurement mode. In response to detecting the action, the computing device is caused to operate in the mass-measurement mode. The mass-measurement mode may involve a variety of functions. For instance, the mass-measurement mode may involve receiving a motion-sensor signal from at least one motion sensor, where the motion-sensor signal includes a first range of frequency components associated with a first range of frequencies and a second range of frequency components associated with a second range of frequencies, where the second range of frequencies is higher than the first range of frequencies. The mass-measurement mode may then involve determining a difference between a frequency-component magnitude of at least one given frequency component in the second range of frequency components and a predetermined frequency-component magnitude. The mass-measurement mode may then involve determining a mass of an object based on at least the determined difference between the frequency-component magnitude of the at least one given frequency component from the predetermined frequency-component magnitude. And the mass-measurement mode may then involve causing an output device to provide an indication of the determined mass of the object.

In another aspect, an example system may include: means for detecting an action that corresponds to a mass-measurement mode. The system may also include means for, in response to detecting the action, causing a computing device to operate in the mass-measurement mode. The mass-measurement mode may involve a variety of functions. For instance, the mass-measurement mode may involve receiving a motion-sensor signal from at least one motion sensor, where the motion-sensor signal includes a first range of frequency components associated with a first range of frequencies and a second range of frequency components associated with a second range of frequencies, where the second range of frequencies is higher than the first range of frequencies. The mass-measurement mode may then involve determining a difference between a frequency-component magnitude of at least one given frequency component in the second range of frequency components and a predetermined frequency-component magnitude. The mass-measurement mode may then involve determining a mass of an object based on at least the determined difference between the frequency-component magnitude of the at least one given frequency component from the predetermined frequency-component magnitude. And the mass-measurement mode may then involve causing an output device to provide an indication of the determined mass of the object.

In another aspect, a non-transitory computer-readable medium may have program instructions stored thereon, the instructions including: instructions for detecting by a computing device an action that corresponds to a mass-measurement mode. And instructions for, in response to detecting the action, the computing device is caused to operate in the mass-measurement mode. The mass-measurement mode may involve a variety of functions. For instance, the mass-measurement mode may involve receiving a motion-sensor signal from at least one motion sensor, where the motion-sensor signal includes a first range of frequency components associated with a first range of frequencies and a second range of frequency components associated with a second range of frequencies, where the second range of frequencies is higher than the first range of frequencies. The mass-measurement mode may then involve determining a difference between a frequency-component magnitude of at least one given frequency component in the second range of frequency components and a predetermined frequency-component magnitude. The mass-measurement mode may then involve determining a mass of an object based on at least the determined difference between the frequency-component magnitude of the at least one given frequency component from the predetermined frequency-component magnitude. And the mass-measurement mode may then involve causing an output device to provide an indication of the determined mass of the object.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE FIGURES

FIGS. 5A, 5B, and 5C shows various example interactions with the example smartwatch, in accordance with the example method.

DETAILED DESCRIPTION

Figure 1:
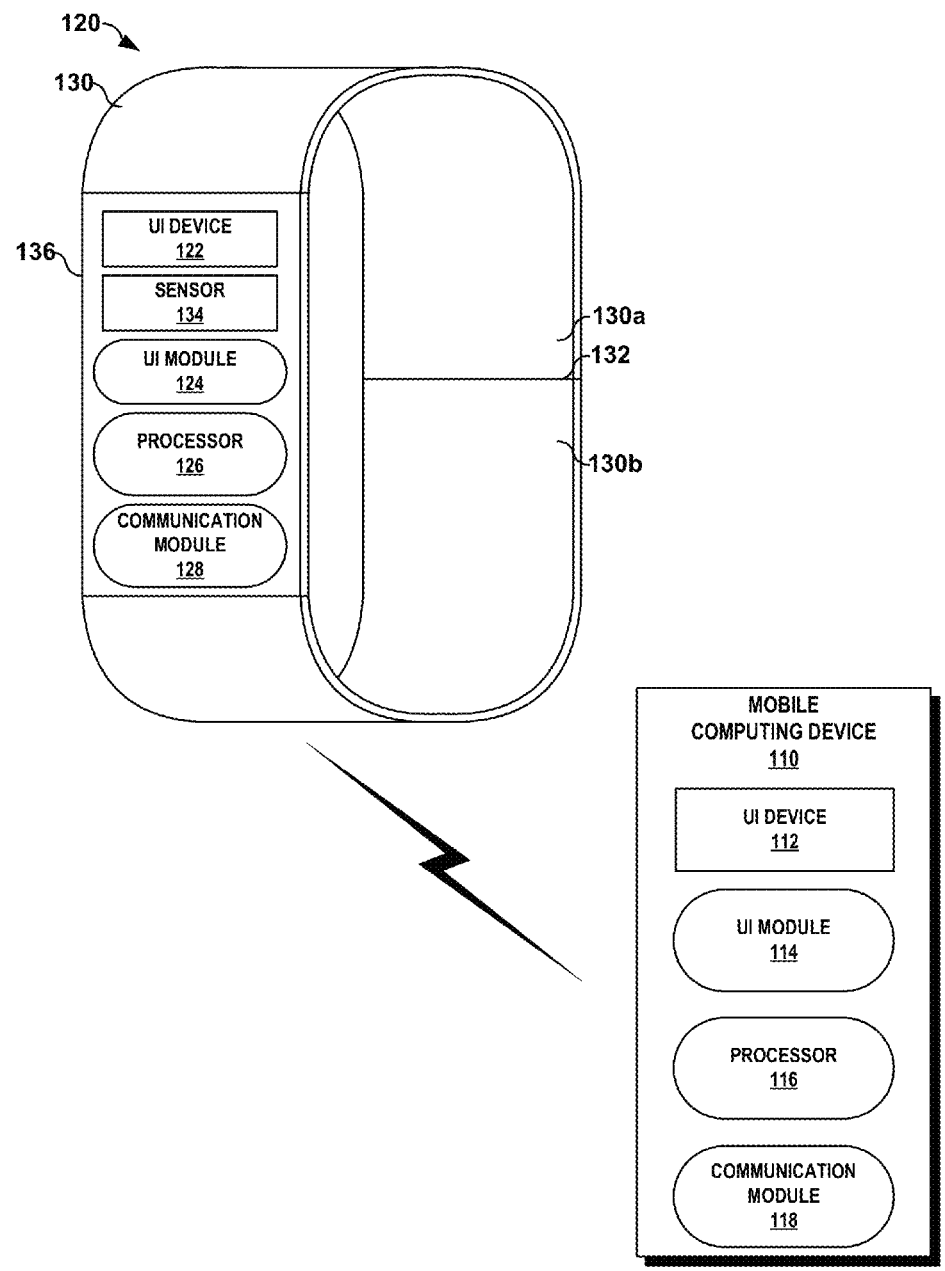
FIG. 1 shows a first view of an example smartwatch in communication with a mobile device.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I. Overview

As noted above, the methods and systems disclosed herein generally relate to automatic measurement of the mass of an object. In one embodiment, the methods may be carried out by a wearable computing device. One type of wearable computing device is a smartwatch. Such a smartwatch may be a device that is worn on the wrist or arm, like a traditional watch, but may have more interactive features, such as an interactive display. Further, such a smartwatch may include one or more motion and/or positioning sensors, such as the sensors in an inertial measurement unit (IMU), that are physically coupled (e.g., by way of a watch containing the sensors that is worn by a wearer) to a body part of the wearer such that it is capable of monitoring inertial characteristics of the body part. As discussed further below, such inertial characteristics may be used to infer, approximate, or otherwise determine the mass of an object that is physically coupled to the body part (e.g., grasped by the wearer of a smartwatch).

There may be various ways the wearer could interact with the smartwatch. In one way, a wearer may interact with the smartwatch to first cause it to enter a mass-measurement mode, and thereby cause the smartwatch to measure the mass of an object that is being grasped by the wearer (or otherwise held, e.g., resting in a wearer's palm).

Thus, in practice, a wearer that uses the invention may hold an object in their palm while wearing a smartwatch. A measurement mode (wherein the mass of the object is determined) may be entered by the smartwatch as a result of the wearer turning the palm up to hold the object (thus indicating that the wearer would like to determine the mass). The smartwatch may then be configured to determine the mass of the object based on a measured change in unconscious movements of the wearer's hand. Among the benefits of this implementation is that, because unconscious movements of the wearer's hand are used to determine the mass of the object, the invention provides a simple and intuitive way to measure the mass of the object.

It should be understood that, while certain methods are described herein as carried out by a smartwatch such as that described above, in other embodiments, the methods may be carried out by other wearable computing devices, such as one or more of a smart-ring, smart-glove, and/or smart-helmet. In still other embodiments, the methods may be carried out by one or more other computing devices (whether wearable or not). In such other embodiments, one or more sensors may still be physically coupled to a body part (such as a hand, wrist, or head, among other examples) so as to monitor the inertial characteristics of the body part. In turn, the one or more sensors may then be communicatively coupled to the computing device. The signals provided by such sensors may ultimately be used to automatically determine the mass of an object.

The methods described herein for automatically measuring the mass of an object may be useful in a variety of contexts. Indeed, it may be desirable to determine the mass of an object in an efficient and convenient manner at some unexpected time. However, known techniques for measuring mass are generally not efficient or convenient.

For instance, typically the use of a scale (or some such mass-measurement tool) is required to determine the mass of an object, which may require transporting the object to the scale and placing the object on the scale. Often a scale is not conveniently available when a user may unexpectedly desire to weigh an object. Further, many other issues with use of the scale may exist, such as that the object does not conveniently fit into or onto the scale. For at least these reasons, weighing an object using a conventional scale may be inefficient or inconvenient.

Nonetheless, according to some aspects of the example methods described herein, sensors contained within a wrist- or hand-worn device (or other wearable computing device) may be used to automatically measure the mass of an object held in a user's hand. Accordingly, a user may automatically measure the mass of any object that they may be holding in their hand(s).

To accomplish such a measurement of mass, the example methods involve an analysis of relatively "high-frequency components" of signals received from the sensors. Such high-frequency components generally correspond to the inertial characteristics of the body—e.g., inherent unconscious movements (such as shakes or other moves) of a hand, among other examples. Upon a user grasping or holding an object of a given mass, the inertial characteristics of the hand change in such a way that the magnitude(s) of the high-frequency components of the motion-sensor signal decrease. According to the example method described herein, this decrease may be correlated with the mass of the grasped object.

Thus, in an embodiment, the example methods described herein generally involve entering a mass-measurement mode, and while in the mass-measurement mode receiving a motion-sensor signal from at least one motion sensor, determining that a magnitude of a high frequency component of the signal has decreased, and then, based on the decrease in the magnitude of the high frequency component, determine a mass of an object grasped by a user. The methods also generally involve, first detecting an action (e.g., a hand/arm movement, and/or hand/arm position, among other examples) that indicates that the user might desire, or may intend, to measure the mass of an object (e.g., that the user would like to cause the computing device to enter the mass-measurement mode). In this way, the user may cause the computing device to measure the mass of an object using only relatively low-cost and unobtrusive physical actions and computing actions.

In accordance with the example methods described herein, the motion sensor may be any suitable sensor including, as examples, an accelerometer and/or a gyroscope. Further, the motion sensor may be coupled to the user's hand (or other suitable body part) in any suitable manner. For instance, the sensor may be directly physically coupled to a user's hand, wrist, or arm. Additionally, or alternatively, the user may wear a device containing the sensor, such as a bracelet, watch, glove, or ring.

Moreover, the example methods described herein may also involve a calibration function, whereby a "baseline" of a user's inertial characteristics of the body are determined. The calibration may involve analyzing a motion sensor signal while the user is holding an object of a known mass, or while the user is holding nothing. In such an implementation, the mass of the object may generally be determined based on a difference between the magnitude of a frequency component during calibration and the magnitude of the frequency component while an object is held.

The discussion set forth in the above section is provided for purposes of example and explanation only. It should be understood that the remainder of this disclosure describes additional aspects and embodiments of the example methods and systems described herein. It should be understood that the embodiments described in this overview and elsewhere are intended to be examples only and do not necessarily limit the scope of the claims.

II. Example System and Device Architecture

FIG. 1 illustrates an example smartwatch 120 in communication with a mobile device 110. The smartwatch 120 may be worn around a wearer's wrist with the aid of a watchstrap 130. The watchstrap 130 may have a top portion 130a and a bottom portion 130b, which meet at a clasp position 132. The smartwatch 130 also includes electronics unit 136.

In various embodiments, the electronics unit 136 contains various different components. FIG. 1 presents one possible arrangement of components for the electronics unit 136. In the embodiment shown in FIG. 1, the electronics unit 136 includes a user interface device 122, sensor unit 134, user interface module 124, processor 126, and a communication module 128. In some embodiments, the smartwatch may also include other components such, just one example, a speaker (not pictured).

The user interface device 122 may be coupled to the user interface module 124. The user interface device 122 may includes a liquid crystal display (LCD) screen and touch-sensitive components. The LCD screen may present visual elements to a wearer of the LCD. The touch-sensitive components of the user interface module 124 may interact with a wearer of the smartwatch to provide an input to the smartwatch. The user interface module 124 may include electronic components configured to operate the user interface device 122. The user interface module 124 may control the images shown on the LCD screen as well as interact with the touch-sensitive components of the user interface module 124.

In alternative embodiments, other types of display elements may also be used. For example, the user interface device 122 may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver (such as user interface module 124) may be disposed within the smartwatch 120 for driving such a matrix display. Alternatively or additionally, a laser or light emitting diode (LED) source and scanning system could be used to draw a raster display for one or more of the smartwatch wearer's eyes. Other possibilities for the display exist as well.

The touch-sensitive components may sense at least one of a position and a movement of a finger (or other suitable pointing device) via capacitive sensing, resistance sensing, or a surface acoustic wave process, among other possibilities. The touch-sensitive components may be capable of sensing finger movement in a direction parallel or planar to the pad surface, in a direction normal to the pad surface, or both, and may also be capable of sensing a level of pressure applied to the component surface. The touch-sensitive components may be formed of one or more translucent or transparent insulating layers and one or more translucent or transparent conducting layers. Edges of the touch-sensitive components may be formed to have a raised, indented, or roughened surface, so as to provide tactile feedback to a user when the user's finger reaches the edge, or other area, of the touch-sensitive components. If more than one touch-sensitive component is present, each touch-sensitive component may be operated independently, and may provide a different function.

The smartwatch 120 may also include an on-board computing system powered by a processor 126. The processor may be a general-purpose processor, a custom made processor, or other processor configured to perform tasks within the present disclosure. The on-board computing system may be positioned in a unit of the smartwatch that includes the display; however, in other embodiments, the on-board computing system may be located on or within watchstrap 130 (or on another part of the smartwatch 120). The on-board computing system 118 may include a memory coupled to the processor 126, for example. The on-board computing system may be configured to receive and analyze data from various sensors in the smartwatch 120 or communicated to smartwatch 120. An example computing system is further described below in connection with FIG. 3.

The sensor unit 134 may include a variety of different sensors. The sensors may include various motion sensors such as one or more of each of a gyroscope and/or an accelerometer. The sensors may include any number of additional sensors such as a light sensor, an air pressure sensor, a microphone, a speaker, a touch-sensitive sensor, for example. The sensor unit may also include various other sensors. Each sensor may be configured to sense and/or receive an input form a user of the smartwatch 120.

The communication module 128 may allow the smartwatch 120 to communicate wirelessly. The smartwatch 120 may communicate with a mobile computing device 110, with wireless devices, and/or with other networked computers, for example. The communication module 128 is illustrated as a wireless connection; however, wired connections may also be used. For example, the communication module 128 may include a wired serial bus such as a universal serial bus or a parallel bus, among other connections. The communication module 128 may also include a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well.

As shown in FIG. 1, the smartwatch 120 may be able to wirelessly communicate with a mobile computing device 110. The mobile computing device 110 may provide information, connectivity, processing power, or instructions to the smartwatch 120. In some embodiments, the smartwatch 120 may need to be coupled to a mobile computing device 110 to achieve full functionality. However, in other embodiments, the smartwatch 120 may have full functionality without being coupled to the mobile computing device 110.

For example, in one embodiment the smartwatch 120 may only have short-range wireless communication abilities. In this embodiment, the smartwatch 120 may use the short-range wireless communication to couple to the mobile computing device 110. Through this short-range wireless communication, the smartwatch 120 may achieve long-range wireless communication via the networking provided by the communication module 118 of the mobile computing device 110. The smartwatch 120 may receive an input from the mobile computing device 110. A wearer of smartwatch 120 may provide an input to a user interface 112 of mobile computing device 110. The input received by the user interface 112 of mobile computing device 110, will be relayed to smartwatch 120. And still further embodiments, the smartwatch 120 may send data to mobile computing device 110 for processing by processor 116 in the mobile computing device 110.

For example, the smartwatch 120 may receive a command from a wearer of the smartwatch. The command may indicate a processor-intensive instruction. Rather than process the instruction by itself, the smartwatch 120 will send the instruction to mobile computing device 110 for processing by the processor 116. In one specific example, a wearer of the smartwatch 120 may indicate she would like to send an email. When she enters the email command to the smartwatch 120, it may be relayed to mobile computing device 110. The mobile computing device 110 may create a new email the wearer of the smartwatch 120 can access via the user interface 112 of mobile computing device 110. Therefore, in some embodiments, the smart watch 120 and the mobile computing device 110 may have a symbiotic relationship.

Figure 2:
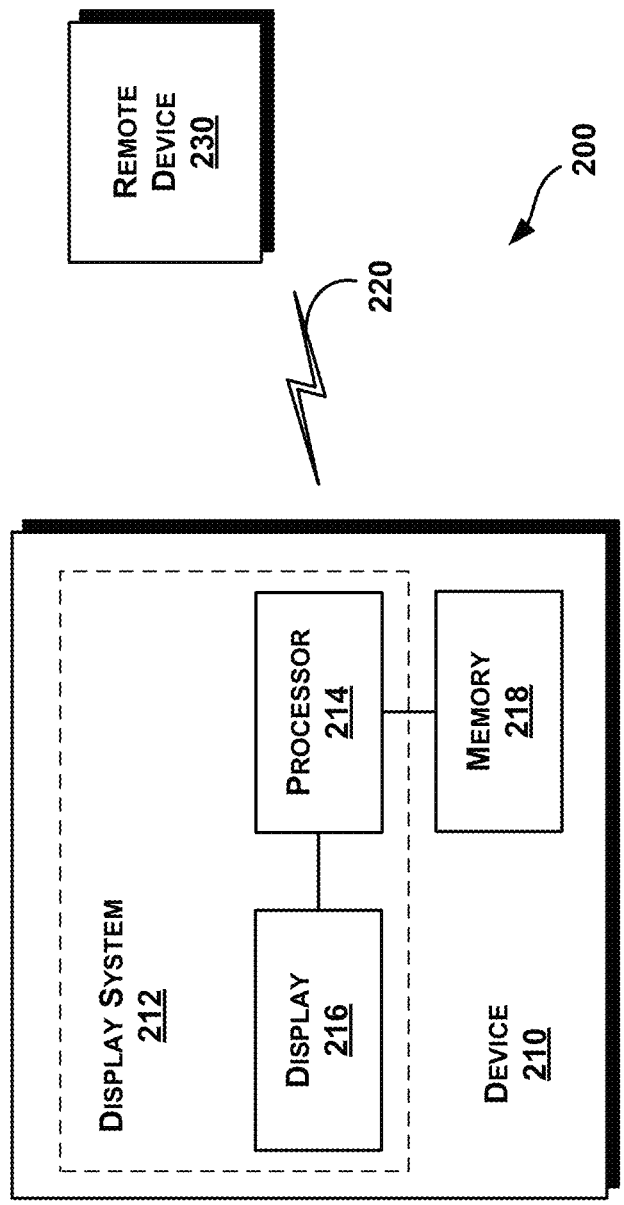
FIG. 2 shows a simplified block diagram of an example computer network infrastructure.

FIG. 2 shows a simplified block diagram of an example computer network infrastructure. In system 200, a device 210 communicates using a communication link 220 (e.g., a wired or wireless connection) to a remote device 230. The device 210 may be any type of device that can receive data and display information corresponding to or associated with the data. For example, the device 210 may be a wearable computing device, such as the smartwatch 120 described with reference to FIG. 1.

Thus, the device 210 may include a display system 212 comprising a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a microprocessor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

In FIG. 2, the communication link 220 is illustrated as a wireless connection; however, wired connections may also be used. For example, the communication link 220 may be a wired serial bus such as a universal serial bus or a parallel bus, among other connections. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 230 may be accessible via the Internet and may include a computing cluster associated with a particular web service (e.g., social-networking, photo sharing, address book, etc.).

Figure 3:
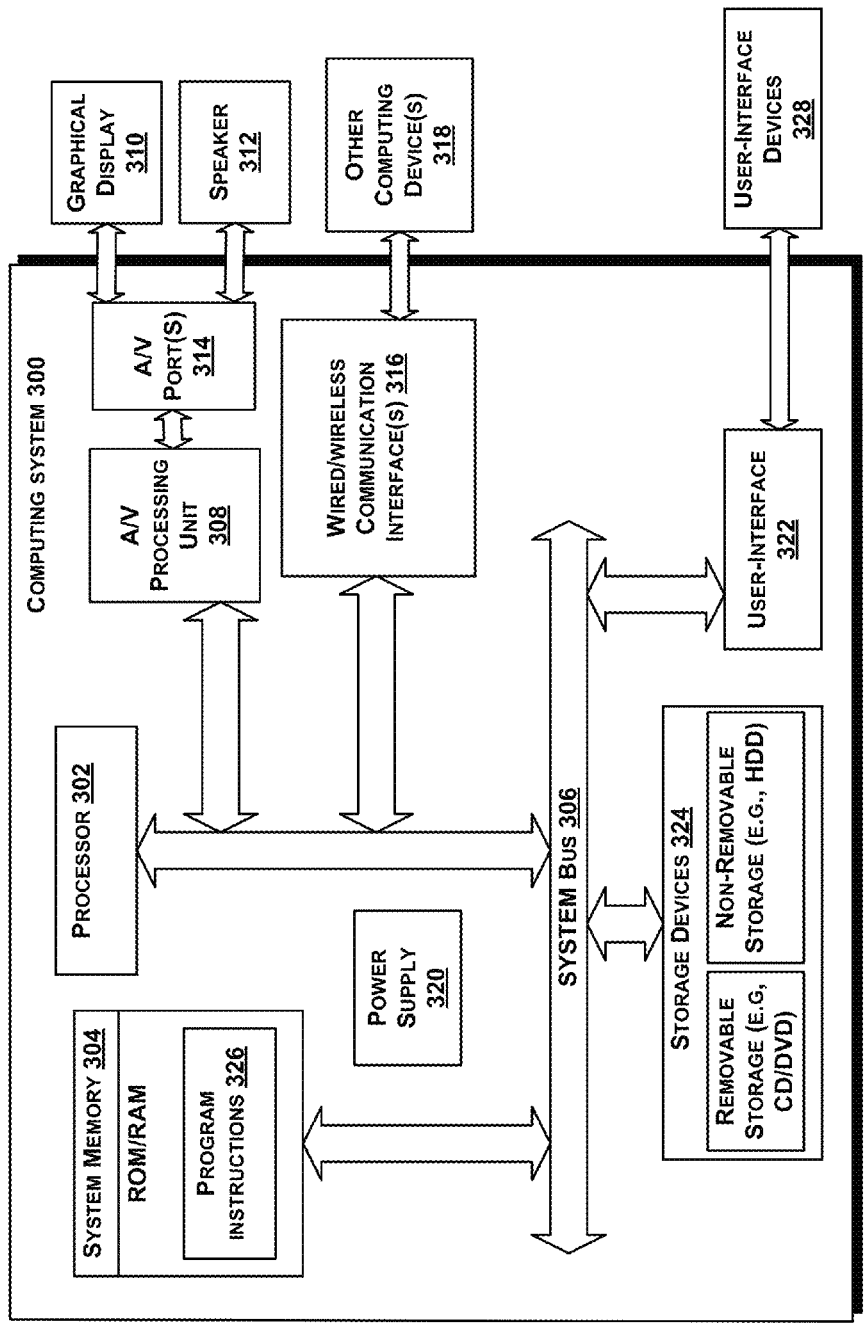
FIG. 3 shows a simplified block diagram depicting example components of an example computing device.

As described above in connection with FIGS. 1 and 2, an example wearable computing device may include, or may otherwise be communicatively coupled to, a computing system, such as computing device 210 or remote device 230. FIG. 3 shows a simplified block diagram depicting example components of an example computing system 300. One or both of the device 210 and the remote device 230 may take the form of computing system 300.

Computing system 300 may include at least one processor 302 and system memory 304. In an example embodiment, computing system 300 may include a system bus 306 that communicatively connects processor 302 and system memory 304, as well as other components of computing system 300. Depending on the desired configuration, processor 302 can be any type of processor including, but not limited to, a microprocessor (µP), a microcontroller (µC), a digital signal processor (DSP), or any combination thereof. Furthermore, system memory 304 can be of any type of memory now known or later developed including but not limited to volatile memory (such as RAM), non-volatile memory (such as ROM, flash memory, etc.) or any combination thereof.

An example computing system 300 may include various other components as well. For example, computing system 300 includes an A/V processing unit 308 for controlling graphical display 310 and speaker 312 (via A/V port 314), one or more communication interfaces 316 for connecting to other computing devices 318, and a power supply 320. Graphical display 310 may be arranged to provide a visual depiction of various input regions provided by user-interface module 322. For example, user-interface module 322 may be configured to provide a user-interface, and graphical display 310 may be configured to provide a visual depiction of the user-interface. User-interface module 322 may be further configured to receive data from and transmit data to (or be otherwise compatible with) one or more user-interface devices 328.

Furthermore, computing system 300 may also include one or more data storage devices 324, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 300.

According to an example embodiment, computing system 300 may include program instructions 326 that are stored in system memory 304 (and/or possibly in another data-storage medium) and executable by processor 302 to facilitate the various functions described herein including, but not limited to, those functions described with respect to FIG. 5. Although various components of computing system 400 are shown as distributed components, it should be understood that any of such components may be physically integrated and/or distributed according to the desired configuration of the computing system.

III. Example Methods

Figure 4:
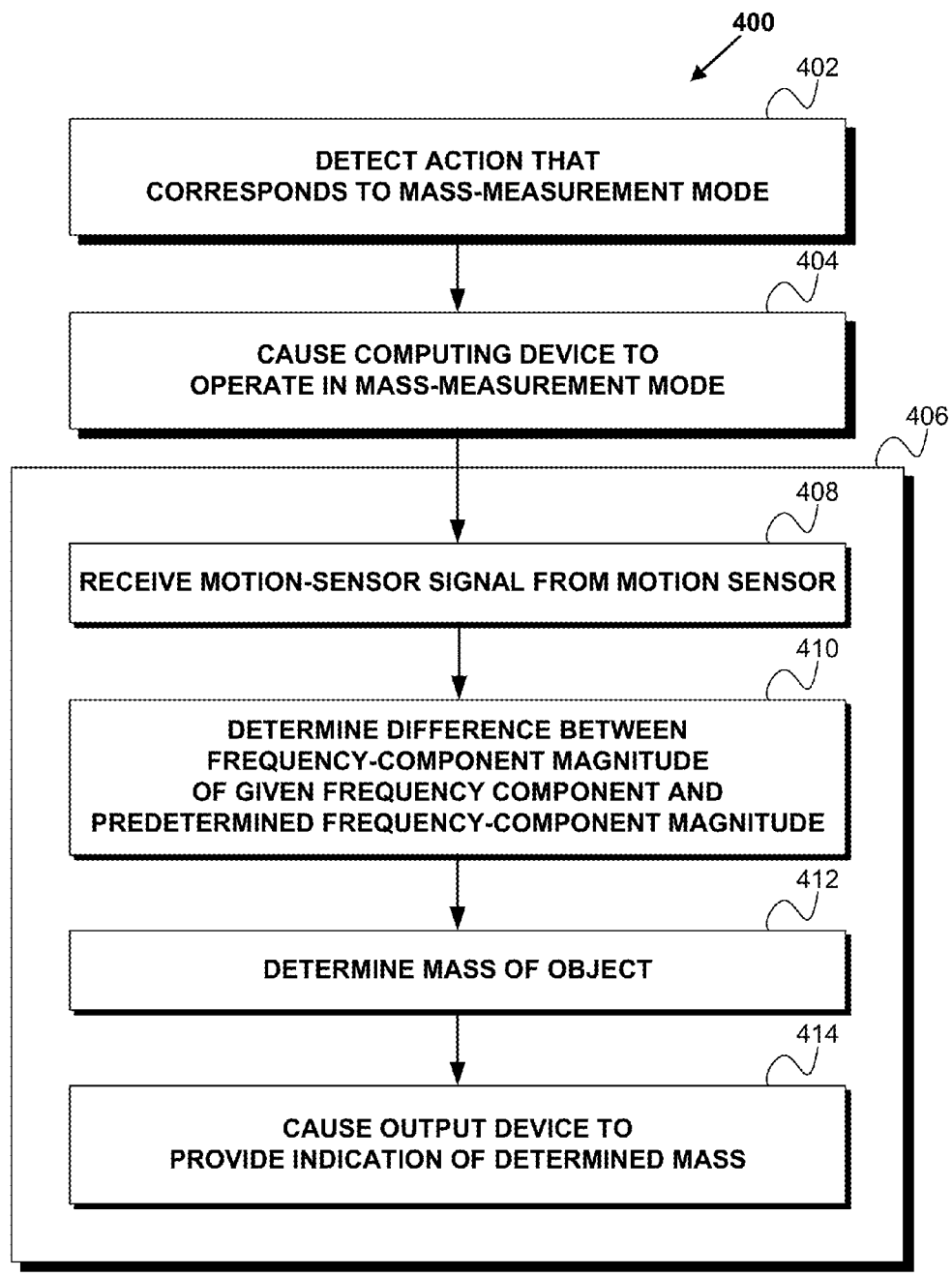
FIG. 4 shows an example flow diagram for automatic mass measurement.

As indicated above, the present disclosure describes example systems and methods for automatically measuring the mass of an object. FIG. 4 shows an example flow diagram 400 for automatic mass measurement, in accordance with at least some embodiments described herein. Method 400 may include one or more operations, functions, or actions as illustrated by one or more of blocks 402-414. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium (such as that described further below with respect to FIG. 8), for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 400 and other processes and methods disclosed herein, each block in FIG. 4 may represent circuitry that is wired to perform the specific logical functions in the process.

Example method 400 begins at block 402 with detecting by a computing device an action that corresponds to a mass-measurement mode. At block 404, in response to detecting the action, the computing device is caused to operate in the mass-measurement mode.

As shown by block 406, the mass-measurement mode may involve a variety of functions. At block 408, the mass-measurement mode involves receiving a motion-sensor signal from at least one motion sensor, where the motion-sensor signal includes a first range of frequency components associated with a first range of frequencies and a second range of frequency components associated with a second range of frequencies, where the second range of frequencies is higher than the first range of frequencies. At block 410, the mass-measurement mode involves determining a difference between a frequency-component magnitude of at least one given frequency component in the second range of frequency components and a predetermined frequency-component magnitude. At block 412, the mass-measurement mode involves determining a mass of an object based on at least the determined difference between the frequency-component magnitude of the at least one given frequency component from the predetermined frequency-component magnitude. And, at block 414, the mass-measurement mode involves causing an output device to provide an indication of the determined mass of the object.

Each of the blocks shown with respect to FIG. 4 is discussed further below. It should be understood, however, that block 406 including the functions described as being a part of the mass-measurement mode, may be carried out separate and apart from either of blocks 402 and 404. And while certain examples are discussed below with respect to a smartwatch, it should be understood that the method described below, and aspects thereof, could just as easily be applied to other wearable computing devices such as smartrings, smartgloves, and/or smarthelmets, among other examples.

A. Detect Action that Corresponds to a Mass-Measurement Mode

Example method 400 begins at block 402 with detecting by a computing device an action that corresponds to a mass-measurement mode.

In accordance with block 402, the action may be detected by the computing device in any suitable manner. In an embodiment, detecting the action may involve the computing device analyzing one or more motion-sensor signals from a motion sensor that is physically coupled to a given body part. For instance, the action may be an action of a hand, such as a gesture of the hand, and the analyzed motion-sensor signal may be received from a motion sensor that is contained within a smartwatch. According to such an embodiment, the motion sensor may be one or more of an accelerometer and/or a gyroscope, though other motion sensors may be used additionally or alternatively in accordance with block 402, as further discussed below.

Detecting the action may involve detecting that the action was made after the action was initially made a single time. For example, the action that corresponds to the mass-measurement mode may be a wearer holding her arm and/or hand in an outstretched position, and therefore detecting the action may involve detecting that a wearer is holding her arm and/or hand in an outstretched position.

FIGS. 5A and 5B show example interactions with an example smartwatch, where the example interaction includes an outstretched arm and hand. In FIG. 5A, person (or "wearer") 502 is shown in first position 500. Wearer 502 is shown as having right arm 504, and is shown as wearing smartwatch 506 on her right arm 504. In accordance with the example action described above, it may be understood that wearer 502 intends to engage in an action that involves placing her right arm 504 and hand in an outstretched position, according to motion arrow 508.

Now, with reference to FIG. 5B, wearer 502 is shown at a second time (later than the first time depicted in FIG. 5A). In FIG. 5B, wearer 502 is also shown in second position 520, after having engaged in the action indicated by motion arrow 508. More particularly, in position 520, wearer 502's right arm 504 and right hand 522 are shown in an outstretched position. Such an action, corresponding to the action indicated by motion arrow 508, is one example of an action that may correspond to the mass-measurement mode, in accordance with block 402.

In another embodiment, detecting the action may involve first detecting that an initial action was made, and then detecting that the wearer held (or otherwise maintained) the action for a given period of time. For example, detecting the action may involve detecting that a wearer has held her arm and hand in an outstretched position, and then maintained her arm and hand in substantially the same outstretched position for a predetermined period of time (such as five seconds, or some other suitable period of time).

In yet another embodiment, detecting the action may involve detecting that an initial action was made, and then determining that the action was repeated a predetermined number of times. For example, detecting the action may involve detecting that a wearer held her arm and hand in an outstretched position, and then lowered and re-raised her hand to the outstretched position some total number of predetermined times (such as 3 times, or some other suitable number of times.

While an outstretched arm and hand is discussed above as one example of an action that may correspond to the mass-measurement mode, it should be understood that this is for purposes of example and explanation only. Other examples of such actions exist.

Indeed, the action that corresponds to the mass-measurement mode may be any suitable action. In one embodiment, the action that corresponds to the mass-measurement mode may generally be an action (or may approximate an action) that a wearer may otherwise carry out to facilitate the measurement. For example, the action involving the wearer placing her arm and hand in an outstretched position as discussed above may also be carried out by the wearer to facilitate the measurement, because it may be desirable for the wearer to hold the mass in such an outstretched position while measuring the mass. Another example of such an action that may otherwise be carried out to facilitate the measurement may be the wearer holding her arm to her side. Yet another example of such an action that may otherwise be carried out to facilitate the measurement may be the wearer bringing one hand together with the other hand in the center of her body, so as to hold the mass with both hands.

Further, it should be understood that while "conscious" or "intentional" actions of a wearer are generally discussed herein at times as examples of actions that may correspond to the mass-measurement mode, it should be understood that such actions need not be conscious or intentional. For instance, the action that corresponds to the mass-measurement mode may be a user grasping or holding an object, without the user consciously or intentionally desiring to measure the mass of the object.

Other examples of such actions that correspond to an action that a wearer may otherwise carry out to facilitate the measurement may exist, and the particular examples discussed herein should not be taken to be limiting.

In another embodiment, the action that corresponds to the mass-measurement mode may generally be an action that wearer may normally not carry out to facilitate the measurement. For example, the action may be the wearer moving her hand from the left side of her body to the right side of her body. As another example, the action may be the wearer moving her hand from a lowered position beside her body to a raised position above her head. As yet another example, the action may be the wearer opening and then closing the fingers of her hand. Other examples of such actions that correspond to actions that are associated with the mass-measurement mode may exist, and the particular examples discussed herein should not be taken to be limiting.

It should also be understood that, although sensors contained within a smartwatch are described above as being involved in detecting the action(s), other sensors may be involved additionally and/or alternatively. For example, one or more sensors contained within a ring may be used. As another, example, one or more sensors contained within a glove may be used. Other examples of such sensors, and other positions of such sensors, may exist as well.

Further, although the example actions described above generally involve a wearer's hands and/or arms, it should be understood that the action that corresponds to the mass-measurement mode may involve other body parts as well or in the alternative. For example, the action may involve the movement of the wearer's head (such as a nod, or a shake). As another example, the action may involve the movement of one or more of a wearer's legs. Actions involving other body parts may exist as well.

As noted above, while accelerometers and/or gyroscopes may be implemented as motion sensors that are involved in detecting the action that corresponds to the mass-measurement mode, other motion sensors may be used additionally or alternatively. For example, one or more cameras may be used to help detect the action. Such a camera may be coupled with suitable image-analysis hardware and/or software to facilitate recognition of a given action. Other such examples may exist as well.

Further, while, in accordance with block 402, a motion-based action is detected, other indications that are associated with the mass-measurement mode may be detected by the computing device additionally and/or alternatively. For example, a sound sensor (i.e., a microphone) may detect a voice indication that is associated with the mass-measurement mode. For instance, the wearer may state "enter mass-measurement mode" or "weigh this," among other examples. As another example, a touch interface (e.g., a touch interface embedded into a smartwatch or heads-up display) may detect a touch input (such as the press of a button or other preconfigured swipe) that is associated with the mass-measurement mode.

As one particular example, a wearer may at the same time be wearing a smartwatch capable of measuring the mass of an object and a heads-up display. The smartwatch and the heads-up display may be communicatively coupled, such that the user may initiate the mass-measurement mode by performing an action at an interface associated with the heads-up display. For instance, the wearer may provide a voice indication and/or a touch input that is detected by the heads-up display and that is then interpreted as an action that causes the smartwatch to enter the mass-measurement mode.

Other such examples may exist as well.

Moreover, in association with block 402, after detecting by the computing device an action that corresponds to a mass-measurement mode, the computing device may prompt the user to provide a confirmation that the user would like to enter the mass-measurement mode. For instance, the computing device may cause a graphical display embedded in the smartwatch to provide a visual indication that the computing device will enter the mass-measurement mode. The wearer may then confirm entry of the mass-measurement mode by pressing a confirmation button, speaking an audible confirmation, and/or performing a confirmation action, among other examples. Such a confirmation may be provided by the wearer before proceeding with block 404 of method 400, as described below. In this way, the method may help avoid unintentionally entering the mass-measurement mode. However, such a confirmation is not necessary.

B. Cause Computing Device to Operate in Mass-Measurement Mode

At block 404, in response to detecting the action, the computing device is caused to operate in the mass-measurement mode. As a general matter, the mass-measurement mode may function to automatically measure the mass of an object and then provide an indication of the measured mass to the wearer, among other functions.

Indeed, as shown by block 406, the mass-measurement mode may involve a variety of functions, each of which is discussed in more detail below. It should be understood that the mass-measurement mode may be carried out while the computing device carries out other modes and/or functions. Alternatively, the computing device may carry out only functions associated with the mass-measurement mode while in the mass-measurement mode.

a. Receive Motion-Sensor Signal from Motion Sensor

At block 408, the mass-measurement mode involves receiving a motion-sensor signal from at least one motion sensor. As will be discussed further below, in accordance with block 408, the motion-sensor signal includes a first range of frequency components associated with a first range of frequencies and a second range of frequency components associated with a second range of frequencies. Further, the second range of frequencies is higher than the first range of frequencies.

As noted above, the motion sensor implemented in accordance with block 408 (and the corresponding blocks described with respect to method 400) may be any suitable motion sensor, such as an accelerometer and/or gyroscope, as will be appreciated by those of skill in the art. Further, those of skill in the art will appreciate that the motion sensor may be communicatively coupled to a suitable computing device for analysis of the motion-sensor signal using known configurations and/or arrangements.

As a general matter, receiving the motion-sensor signal in accordance with block 408 may involve receiving the motion-sensor signal at the time the wearer is grasping an object that is to be weighed (or such an object is otherwise physically coupled to the wearer). Nonetheless, for purposes of example and explanation, certain characteristics and/or aspects of the motion-sensor signal are described below at times without particular reference to whether or not the object is physically coupled to the wearer.

Figure 6A:
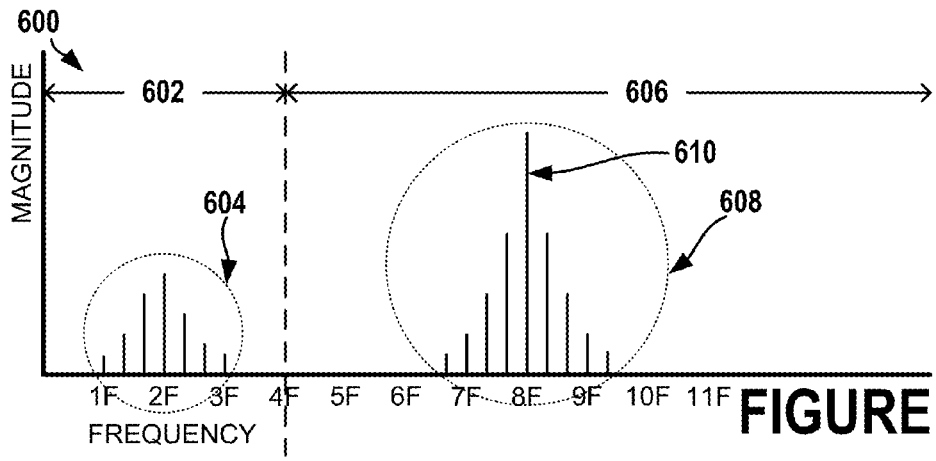
FIGS. 6A, 6B, and 6C show various example frequency-component charts, in accordance with the example method.

FIG. 6A shows a first example frequency-component chart 600 that includes a first range of frequency components associated with a first range of frequencies 602 and a second range of frequency components associated with a second range of frequencies 606. Further, second range of frequencies 606 is greater than the first range of frequencies 602. Frequency chart 600 may be understood to represent an example motion-sensor signal such as that that may be received from a motion sensor contained within smartwatch 506 while wearer 502 is holding her right arm 504 and hand 522 in an outstretched position as shown in FIG. 5B.

As shown, first range of frequencies 602 includes first range of frequency components 604. Frequency components 604 may be understood to generally correspond to relatively "low" frequency components of the motion sensor signal received from the motion sensor in smartwatch 506. Such low frequency components 604 may generally correspond to intentional, or conscious, movements of the wearer's arm and/or hand, as such intentional movements may generally be characterized by a given frequency profile. For example, such low frequency components may correspond to conscious movements of the wearer's arm while the wearer raises her arm according to motion arrow 508. As another example, such frequency components may correspond to the conscious movements of the wearer's wrist and/or arm to place or adjust it in a comfortable position once the wearer's arm is outstretched. Frequency components 604 may generally be anywhere in the range of 0.1 Hz to 5 Hz, though this is not necessary. Frequency components 604 may generally be higher, or lower, in accordance with the example method described herein.

In turn, second range of frequencies 606 includes second range of frequency components 608. Frequency components 608 may be understood to generally correspond to relatively "high" frequency components of the motion sensor signal received from the motion sensor in smartwatch 506. Such high frequency components 608 may generally correspond to unintentional, or unconscious, movements of the wearer's arm and/or hand. Such movements may generally be referred to as "inertial characteristics," "inertial movements," or "jitter" of the body part. Such high frequency components 608 may generally be present (in one form or another) regardless of the conscious position and/or motion of the wearer's arm and/or hand. For example, such high frequency components may generally be present while the wearer has her arm and hand in the outstretched position depicted in FIG. 5B. As will be discussed further below, the exact form of high frequency components 608 may vary dependent on the mass affixed to the corresponding body part (such as the mass of an object grasped by the wearer). Frequency components 604 may generally be anywhere in the range of 10 Hz to 150 Hz, though this is not necessary. Frequency components 608 may generally be higher, or lower, in accordance with the example method described herein.

Further, note that receiving the motion-sensor signal from at least one motion sensor in accordance with block 408 may involve two or more motion sensors. For instance, two or more motion sensors may be embedded within a single wearable computing device, and a respective motion-sensor signal may be received from each such embedded motion sensor. Additionally and/or alternatively, a first motion sensor may be embedded within a first wearable computing device (such as a smartwatch), and a second motion sensor may be embedded within a second wearable computing device (such as a smartring), and a respective motion-sensor signal may be received from each such embedded motion sensor. As another option, a first motion sensor may be embedded within a first wearable computing device (such as a first smartwatch on a wearer's left arm) and a second motion sensory may be embedded within a second wearable computing device (such as a second smartwatch on a wearer's second arm), and a respective motion-sensor signal may be received from each such embedded sensor.

Thus, receiving the motion-sensor signal from the at least one motion sensor in accordance with block 404 may involve receiving a first motion-sensor signal from the first at least one motion sensor and then after receiving the first motion-sensor signal, receiving a second motion-sensor signal from the second at least one motion sensor.

b. Determine Difference Between Frequency-Component Magnitude of Given Frequency Component and Predetermined Frequency-Component Magnitude At block 410, the mass-measurement mode involves determining a difference between a frequency-component magnitude of at least one given frequency component in the second range of frequency components and a predetermined frequency-component magnitude.

As noted above, high frequency components 608 may depend on the inertial characteristics of the body part to which the motion sensor is physically coupled. In accordance with block 410, differences or changes in such high frequency components when a user is physically coupled to an object (e.g., grasping the object) as compared to when the user is not physically coupled to the object may be used to infer a mass of the object.

As noted, when the computing device receives the at least one given frequency component in the second range of frequency components in accordance with block 408 above, the wearer may be holding, or may otherwise be physically coupled to, an object that the user desires to weigh. For instance, as shown in FIG. 5C, wearer 502 may hold object 542 in hand 522 of outstretched arm 504. In accordance with method 400, the mass of object 542 may then ultimately be determined.

While not explicitly required by block 410 or method 400, the predetermined frequency-component magnitude may be determined before carrying out the functions associated with block 410 and/or may be determined before carrying out any of the functions corresponding to any of blocks 402-414 of method 400. Such a predetermined frequency-component magnitude may generally correspond to a "peak" or "resonant" inertial characteristic frequency of a body part (e.g., a hand) when the body part is not coupled to an extraneous mass. The predetermined frequency-component magnitude may initially be determined as part of a "calibration process," or some process of the like.

Thus, before receiving the motion-sensor signal in accordance with blocks 408 and 410, the computing device may prompt the wearer to participate in a calibration process. As part of the calibration process, the computing device may prompt the user to "hold still" the body part of interest for some period of time, or hold the body part of interest in a given position. During such a calibration process, the computing device may then receive a motion-sensor calibration signal from the at least one motion sensor, where, when receiving the motion-sensor calibration signal, the mass is not physically coupled to the body part. Then, the computing device may determine the predetermined frequency-component magnitude based on the received motion-sensor calibration signal. For instance, the computing device may set the predetermined frequency-component magnitude equal to a magnitude of the peak frequency component of the motion-sensor calibration signal. Additional, optional, calibration functions are discussed further below.

Accordingly, for purposes of example and explanation, the peak high frequency component 610 of high frequency components 608 may be understood to be the predetermined frequency-component magnitude in accordance with block 410.

It is of note that, in practice, the computing device may not measure (or otherwise "observe") the various frequency components at only a single point in time. Instead, the computing device may observe and/or calculate an average of the frequency-component magnitude of the various frequency components over a predetermined period of time.

Figure 6B:
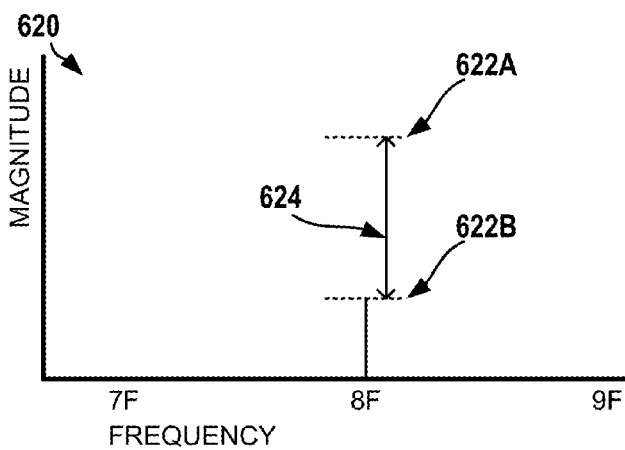

FIG. 6B shows another example frequency-component chart 620, that indicates a decrease in the magnitude of the frequency component corresponding to the peak high frequency component 610 (located at 8F) previously indicated in FIG. 6A. In particular, the magnitude of the frequency component is shown as decreasing from level 622A to level 622B, or a total amount corresponding to amount 624. This decrease in the magnitude of the frequency component 610 may generally be due to the wearer having grasped an object to be weighed.

Figure 6C:
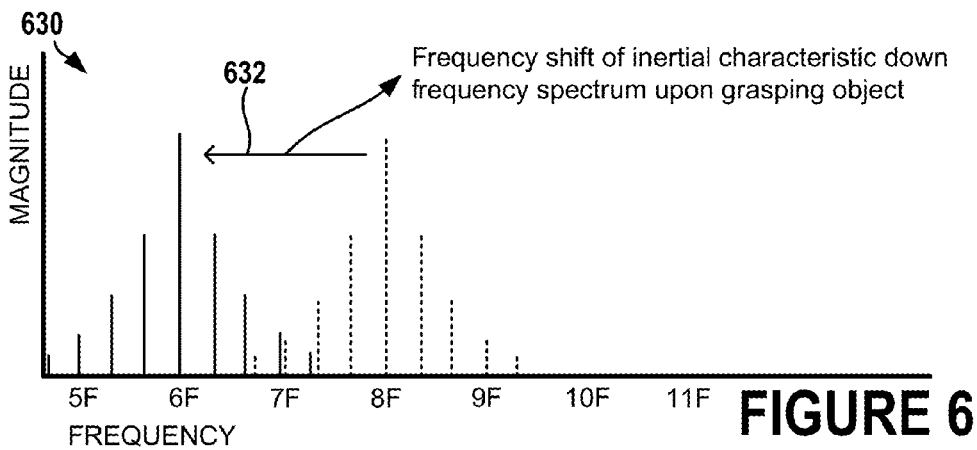

FIG. 6C shows another example frequency-component chart 630, that indicates that the decrease in the magnitude of the frequency component indicated in FIG. 6B may be due, at least in part, to a shift in the peak frequency characteristics of the body part. More particularly, when wearer 502 grasps object 542, the inertial characteristics of wearer 502's arm and hand may change such that the peak frequency component of high frequency components 608 shifts (according to motion arrow 632) left to lower frequency 6F. Thus, as a result of such a shift, the magnitude of the frequency component left at the frequency corresponding to frequency 8F may decrease (as shown in FIG. 6B).

It should be understood that the above discussion of frequency components and magnitudes thereof is provided for purposes of example and explanation only. The figures and corresponding discussion involves relative frequency magnitudes, rather than absolute frequency magnitudes. Correspondingly, the frequencies and magnitudes described and depicted are not necessarily accurate and/or realistic frequencies and magnitudes. Those of skill in the art will understand that the particular frequencies and magnitudes at issue will vary depending on the particular implementation of the methods herein, will vary depending on the wearer, and will vary depending on a number of additional considerations.

c. Determine Mass of Object

At block 412, the mass-measurement mode involves determining a mass of an object based on at least the determined difference between the frequency-component magnitude of the at least given frequency component from the predetermined frequency-component magnitude.

As a general matter, in accordance with block 412, the computing device may infer, approximate, or otherwise determine the mass of the object based on the observed decrease in the frequency-component magnitude described above with respect to FIGS. 6B and 6C. For instance a first given decrease amount (such as decrease amount 624) may be correlated with a first given mass. And a second decrease amount (such as a decrease amount that is greater than decrease amount 624) may be correlated with a second given mass that is greater than the first given mass. Further, a third decrease amount (such as a decrease amount that is less than decrease amount 624) may be correlated with a third given mass that is less than the first given mass.

Correlation of given masses with given decreases in frequency magnitude may be done in any suitable manner. In one implementation, the computing device may be preconfigured to store a correlation table, or lookup table, that maintains a data set that correlates various decrease amounts with given masses. Then, when determining the mass of an object according to block 412, the computing device may reference the look up table using the difference in frequency component magnitude determined in accordance with block 410.

While not explicitly required by block 412 or method 400, correlation data that correlates various decrease amounts with given masses as described above, may be calculated, acquired, or otherwise determined by the computing device before carrying out the functions associated with block 412 and/or before carrying out any of the functions corresponding to any of blocks 402-414 of method 400. Such correlation data may be determined according to a "calibration process," or some process of the like, perhaps in addition to the calibration functions described above with respect to block 410.

Such a calibration process may involve prompting the user to sequentially physically couple to (e.g., grasp) objects of increasing known weights. The computing device may then measure the decrease in frequency component magnitude that is associated with each respective known weight, and store data corresponding to such measurements in a lookup table such as that described above. In this way, a given wearable computing device may be "calibrated" for use by a particular wearer.

Thus, in accordance with such a calibration process, before receiving the motion-sensor measurement signal in accordance with the mass-measurement mode described herein, the computing device may first receive a motion-sensor calibration signal from at least one motion sensor. When receiving the motion-sensor calibration signal, the body part may be physically coupled to a calibration mass. The computing device may then determine a predetermined decrease in frequency-component magnitude associated with the calibration mass, based on the received motion-sensor calibration signal.

It should be understood that the method described herein, including determining a difference between a frequency-component magnitude of at least one given frequency component in the second range of frequency components and a predetermined frequency-component magnitude may have other applications other than measurement of the mass of an object. For instance, the determined difference may be used to detect the connection of a bodily appendage to another object. As one example, the determined difference may be used to detect that a wearer has generally grasped an object, such as the handlebars of a bike. As another example, the determined difference may be used to detect that a wearer has placed a helmet on her head. Other such examples may exist.

d. Cause Output Device to Provide Indication of Determined Mass

At block 414, the mass-measurement mode involves causing an output device to provide an indication of the determined mass of the object.

The indication of the determined mass of the object may be provided by any suitable output device. In one embodiment, the output device may be a graphical display, and the indication of the determined mass of the object may be a visual indication of the determined mass of the object.

Figure 7:
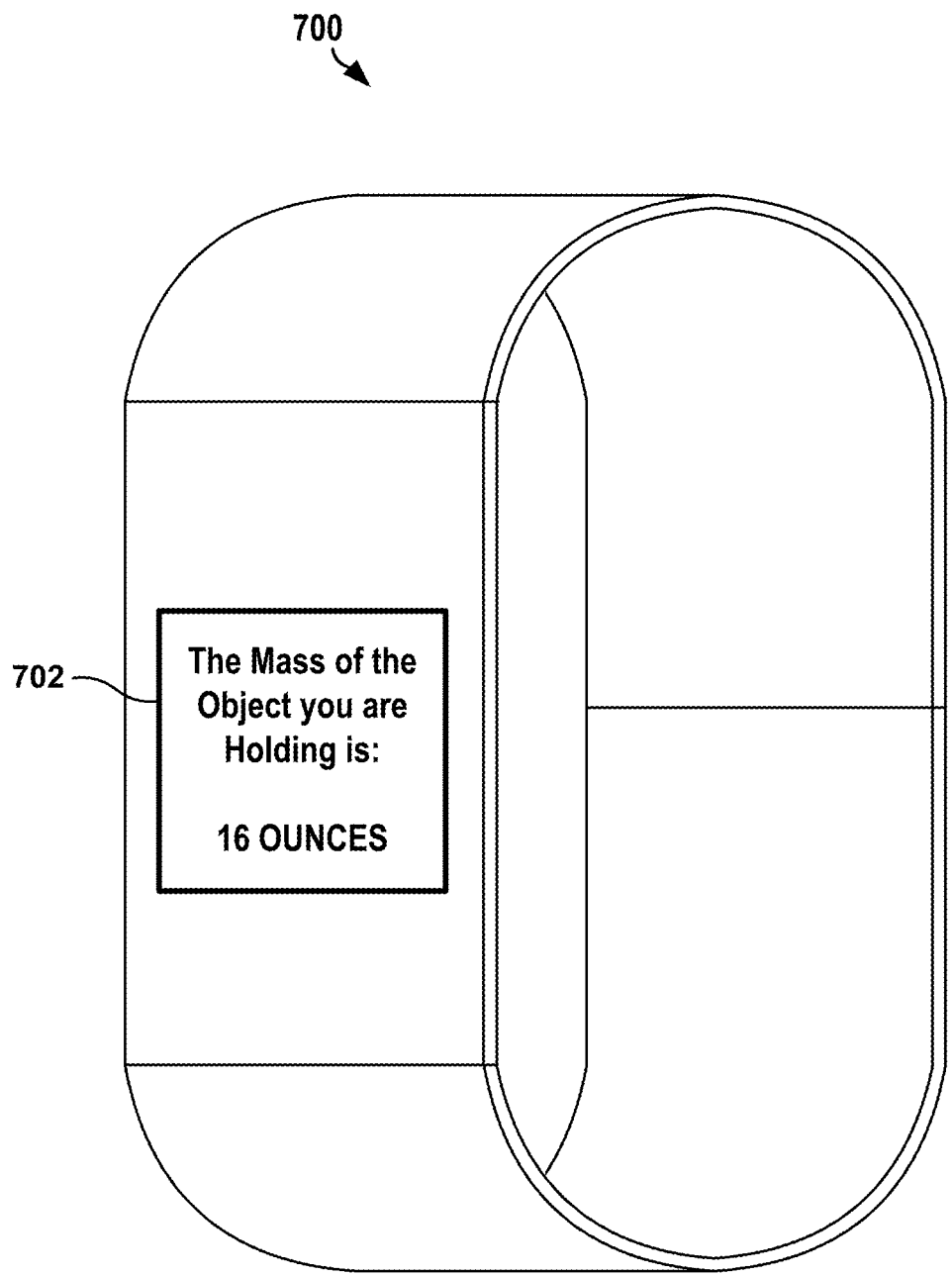
FIG. 7 shows a second view of an example smartwatch including a graphical display, in accordance with the example method.

For instance, FIG. 7 shows an example smartwatch 700 including a graphical display 702, in accordance with block 414. As shown graphical display 702 of smartwatch 700 contains a visual indication that "the Mass of the Object you are Holding is: 16 oz." While this particular visual indication is provided by way of purposes of example and explanation, it should be understood that other visual indications may be used as well.

In another embodiment, the output device may be a audio-output device (such as a speaker, pair of headphones, etc.), and the indication of the determined mass of the object may be an audible indication of the determined mass of the object. For instance, the audible indication of the determined mass of the object may be an audible statement that "the mass of the object you are Holding is 16 oz." While this particular audible indication is provided by way of purposes of example and explanation, it should be understood that other audible indications may be used as well.

Finally, it should be understood that other examples of output devices and/or indications of the determined mass of an object may exist as well. The particular examples set forth herein should not be taken to be limiting.

V. Example Computer Readable Medium

Figure 8:
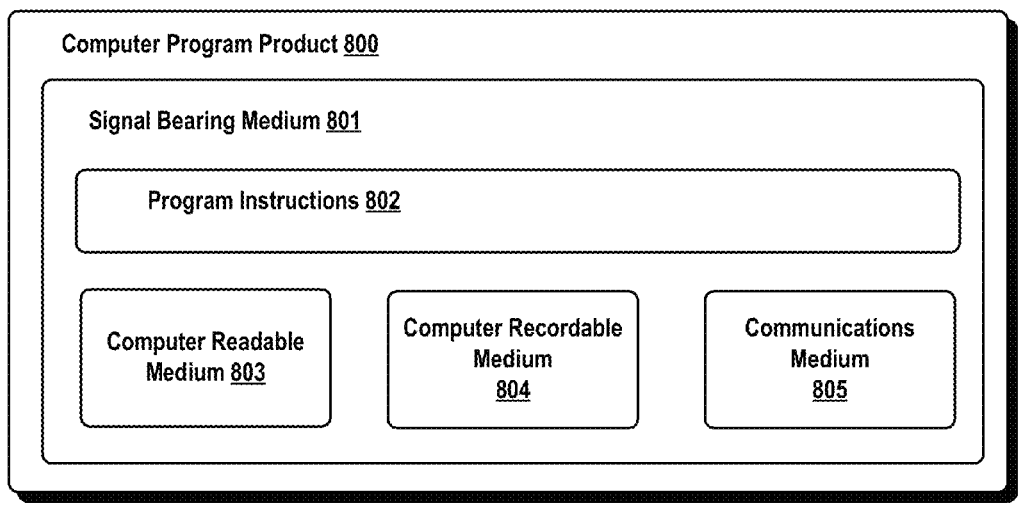
FIG. 8 shows an example computer readable medium.

The disclosed methods can be implemented as computer program instructions encoded on a non-transitory computer-readable storage medium in a machine-readable format, or on other non-transitory media or articles of manufacture. FIG. 8 illustrates a computer program product 800, according to an embodiment. The computer program product 800 includes a computer program for executing a computer process on a computing device, arranged according to some disclosed implementations.

The computer program product 800 is provided using a signal bearing medium 801. The signal bearing medium 801 can include one or more programming instructions 802 that, when executed by one or more processors, can provide functionality or portions of the functionality discussed above in connection with FIGS. 1-7. In some implementations, the signal bearing medium 801 can encompass a computer-readable medium 803 such as, but not limited to, a hard disk drive, a CD, a DVD, a digital tape, or memory. In some implementations, the signal bearing medium 801 can encompass a computer-recordable medium 804 such as, but not limited to, memory, read/write (R/W) CDs, or R/W DVDs. In some implementations, the signal bearing medium 801 can encompass a communications medium 805 such as, but not limited to, a digital or analog communication medium (for example, a fiber optic cable, a waveguide, a wired communications link, or a wireless communication link). Thus, for example, the signal bearing medium 801 can be conveyed by a wireless form of the communications medium 805 (for example, a wireless communications medium conforming with the IEEE 802.11 standard or other transmission protocol).

The one or more programming instructions 802 can be, for example, computer executable instructions. A computing device (such as the processor 126 of FIG. 1) can be configured to provide various operations in response to the programming instructions 802 conveyed to the computing device by one or more of the computer-readable medium 803, the computer recordable medium 804, and the communications medium 805.

While various examples have been disclosed, other examples will be apparent to those skilled in the art. The disclosed examples are for purposes of illustration and are not intended to be limiting, with the true scope and spirit being indicated by the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   detecting by a computing device an action that corresponds to a mass-measurement mode; and
   in response to detecting the action, causing the computing device to operate in the mass-measurement mode, wherein operating in the mass-measurement mode comprises:
      receiving a motion-sensor signal from at least one motion sensor, wherein the motion-sensor signal comprises a first range of frequency components associated with a first range of frequencies and a second range of frequency components associated with a second range of frequencies, wherein the second range of frequencies is higher than the first range of frequencies;
      determining a difference between a frequency-component magnitude of at least one given frequency component in the second range of frequency components and a predetermined frequency-component magnitude;
      determining a mass of an object based on at least the determined difference between the frequency-component magnitude of the at least one given frequency component from the predetermined frequency-component magnitude; and
      causing an output device to provide an indication of the determined mass of the object.

2. The method of claim 1, wherein the at least one motion sensor is physically coupled to a body part.

3. The method of claim 2, wherein, when receiving the motion-sensor signal, the mass is physically coupled to the body part.

4. The method of claim 2, wherein the body part is at least one of a hand, a wrist, an arm, or a head.

5. The method of claim 4, wherein the body part is the hand, and wherein the at least one motion sensor is contained within one or more of a glove and a ring.

6. The method of claim 4, wherein the body part is the wrist, and wherein the at least one motion sensor is contained within one or more of a glove and a watch.

7. The method of claim 4, wherein the motion-sensor signal is a motion-sensor measurement signal, the method further comprising:
   before receiving the motion-sensor measurement signal, receiving a motion-sensor calibration signal from the at least one motion sensor, wherein, when receiving the motion-sensor calibration signal, the mass is not physically coupled to the body part; and
   determining the predetermined frequency-component magnitude based on the received motion-sensor calibration signal.

8. The method of claim 2, wherein the motion-sensor signal is a motion-sensor measurement signal, and wherein the mass is a subject mass, the method further comprising:
   before receiving the motion-sensor measurement signal, receiving a motion-sensor calibration signal from the at least one motion sensor,
   wherein, when receiving the motion-sensor calibration signal, the body part is physically coupled to a calibration mass, and
   wherein, when receiving the motion-sensor measurement signal, the body part is not physically coupled to the calibration mass; and
   determining a predetermined decrease in frequency-component magnitude associated with the calibration mass based on the received motion-sensor calibration signal.

9. The method of claim 1, wherein the at least one motion sensor comprises a first at least one motion sensor and a second at least one motion sensor, wherein the first at least one motion sensor is physically coupled to one of a left hand and a right hand, and wherein the second at least one motion sensor is physically coupled to the other of the left hand and the right hand.

10. The method of claim 9, wherein receiving the motion-sensor signal from the at least one motion sensor comprises:
    receiving a first motion-sensor signal from the first at least one motion sensor; and
    after receiving the first motion-sensor signal, receiving a second motion-sensor signal from the second at least one motion sensor.

11. The method of claim 1, wherein the frequency-component magnitude is an average frequency-component magnitude.

12. The method of claim 1, wherein the at least one motion sensor comprises at least one of an accelerometer or a gyroscope.

13. A system comprising:
    a non-transitory computer readable medium; and
    program instructions stored on the non-transitory computer readable medium and executable by at least one processor to cause a computing device to:
       detect an action that corresponds to a mass-measurement mode; and in response to detecting the action, cause the computing device to operate in the mass-measurement mode, wherein operating in the mass-measurement mode comprises:
   receiving a motion-sensor signal from at least one motion sensor, wherein the motion-sensor signal comprises a first range of frequency components associated with a first range of frequencies and a second range of frequency components associated with a second range of frequencies, wherein the second range of frequencies is higher than the first range of frequencies;
   determining a difference between a frequency-component magnitude of at least one given frequency component in the second range of frequency components and a predetermined frequency-component magnitude;
   determining a mass of an object based on at least the determined difference between the frequency-component magnitude of the at least one given frequency component from the predetermined frequency-component magnitude; and
   causing an output device to provide an indication of the determined mass of the object.

14. The system of claim 13, wherein the at least one motion sensor is physically coupled to a body part.

15. The system of claim 14, wherein the motion-sensor signal is a motion-sensor measurement signal, the system further comprising program instructions stored on the non-transitory computer readable medium and executable by at least one processor to cause the computing device to:
   before receiving the motion-sensor measurement signal, receive a motion-sensor calibration signal from the at least one motion sensor, wherein, when receiving the motion-sensor calibration signal, the mass is not physically coupled to the body part; and
   determine the predetermined frequency-component magnitude based on the received motion-sensor calibration signal.

16. The system of claim 14, wherein the motion-sensor signal is a motion-sensor measurement signal, and wherein the mass is a subject mass, the system further comprising program instructions stored on the non-transitory computer readable medium and executable by at least one processor to cause the computing device to:
   before receiving the motion-sensor measurement signal, receive a motion-sensor calibration signal from the at least one motion sensor,
      wherein, when receiving the motion-sensor calibration signal, the body part is physically coupled to a calibration mass, and
      wherein, when receiving the motion-sensor measurement signal, the body part is not physically coupled to the calibration mass; and
   determine a predetermined decrease in frequency-component magnitude associated with the calibration mass based on the received motion-sensor calibration signal.

17. A non-transitory computer readable medium having instructions stored thereon, the instructions comprising:
   instructions for detecting by a computing device an action that corresponds to a mass-measurement mode; and
   instructions for, in response to detecting the action, causing the computing device to operate in the mass-measurement mode, wherein operating in the mass-measurement mode comprises:
      receiving a motion-sensor signal from at least one motion sensor, wherein the motion-sensor signal comprises a first range of frequency components associated with a first range of frequencies and a second range of frequency components associated with a second range of frequencies, wherein the second range of frequencies is higher than the first range of frequencies;
      determining a difference between a frequency-component magnitude of at least one given frequency component in the second range of frequency components and a predetermined frequency-component magnitude;
      determining a mass of an object based on at least the determined difference between the frequency-component magnitude of the at least one given frequency component from the predetermined frequency-component magnitude; and
      causing an output device to provide an indication of the determined mass of the object.

18. The non-transitory computer readable medium of claim 17, wherein the at least one motion sensor is physically coupled to a body part.

19. The non-transitory computer readable medium of claim 18, wherein the motion-sensor signal is a motion-sensor measurement signal, the instructions further comprising:
   instructions for, before receiving the motion-sensor measurement signal, receiving a motion-sensor calibration signal from the at least one motion sensor, wherein, when receiving the motion-sensor calibration signal, the mass is not physically coupled to the body part; and
   instructions for determining the predetermined frequency-component magnitude based on the received motion-sensor calibration signal.

20. The non-transitory computer readable medium of claim 18, wherein the motion-sensor signal is a motion-sensor measurement signal, and wherein the mass is a subject mass, the instructions further comprising:
   instructions for, before receiving the motion-sensor measurement signal, receiving a motion-sensor calibration signal from the at least one motion sensor,
      wherein, when receiving the motion-sensor calibration signal, the body part is physically coupled to a calibration mass, and
      wherein, when receiving the motion-sensor measurement signal, the body part is not physically coupled to the calibration mass; and
   instructions for determining a predetermined decrease in frequency-component magnitude associated with the calibration mass based on the received motion-sensor calibration signal.

* * * * *